April 15, 1969  G. MAESTRELLI  3,438,497
METHOD AND APPARATUS FOR THE AUTOMATIC CLEANSING OF
THE FILTER FOR A SOLVENT, PARTICULARLY
IN DRY-CLEANING PLANTS
Filed June 8, 1967

April 15, 1969 G. MAESTRELLI 3,438,497
METHOD AND APPARATUS FOR THE AUTOMATIC CLEANSING OF
THE FILTER FOR A SOLVENT, PARTICULARLY
IN DRY-CLEANING PLANTS
Filed June 8, 1967 Sheet 3 of 3

Gino Maestrelli,
INVENTOR.

BY Wenderoth, Lind
and Ponack,
Attorneys

United States Patent Office 3,438,497
Patented Apr. 15, 1969

3,438,497
METHOD AND APPARATUS FOR THE AUTOMATIC CLEANSING OF THE FILTER FOR A SOLVENT, PARTICULARLY IN DRY-CLEANING PLANTS
Gino Maestrelli, 55 Via Bernardo Quaranta, Milan, Italy
Filed June 8, 1967, Ser. No. 644,560
Claims priority, application Italy, Feb. 15, 1967, 12,649/67
Int. Cl. B01d 33/02, 25/34
U.S. Cl. 210—79     11 Claims

ABSTRACT OF THE DISCLOSURE

A method and apparatus for the automatic cleansing of a filter for a solvent in dry-cleaning plants wherein a plurality of filtering elements fitted in a chamber are temporarily moved in such a way as to clean their filtering surfaces owing to a turbulent motion of the solvent. The filtering elements, each consisting of an elongated hollow frame whereon spaced wires are wound, are arranged around at least two supporting spindles, which are rotated at time intervals in said chamber.

---

This invention concerns a method and apparatus for the automatic cleansing of a filter for the solvent, particularly applicable to dry-cleaning plants of any kind.

Such filters are provided in dry-cleaners, for cleansing the solvent by removing continuously therefrom the dirt and sediment picked up from the clothes present in the swinging basket. Such solvent is continuously bypassed, while the washing is in progress, through the filter, where the dirt is removed therefrom, after which it is recycled, wholly clarified—and thus in condition to develop its proper cleaning action—into the washing chamber. Owing to the presence of the filter, clear solvent always flows, in the so called "solvent cycling," to the washing basket of the machine.

In practice, the solvent filtering step is concurrent with the cleaning step of the clothes and at the end of such steps, or after a given number of steps, the solvent filter is cleansed by the machine. Such an operation consists in the removal from all filter surfaces, of the whole amount of material which has been kept back thereon, and consists of the organic powder, by which the proper filtering action—i.e. the removal of grease and dirt from the solvent which is flowing therethrough—is exerted, along with the dirt that has been retained in such powder.

Some difficulties are encountered in the cleansing of all known solvent filters. In addition, the manufacturing and assembling of such filters are far from being simple operations, and they cannot be readily adapted to different capacities of the single dry-cleaner type, where filters of many different sizes, tailor-made for the different plants, are kept in stock.

The above and further drawbacks are obviated by the invention whereby the automatic cleansing of the solvent filter is attained.

A further object is to provide means whereby a suitable motion is temporarily imparted to the filtering elements, pertaining to at least two assemblies, fitted within the same chamber, while their filtering surfaces having wire windings with micrometrically spaced turns are cleaned, whereby a turbulent motion of the solvent is caused, which is essentially operative in the zone or zones adjacent to the filtering elements pertaining to the different assemblies, resulting in a pumping effect of the solvent through the intervening spaces or passage between the adjacent filtering elements. By such action, the layers of filtering powder and dust, previously formed on the filtering surfaces of the elements, are thoroughly removed and carried away, thereby restoring the filtering efficiency of the filter surfaces.

A further object is to provide a construction wherein the motion temporarily imparted to the assemblies formed by the filtering elements, is advantageously a rotary or a swinging one, and such motions may be directed either in the same, or in opposite directions in the different filtering element assemblies.

A further object is to provide means wherein each filtering element consists of a suitably shaped, elongated hollow frame having conveniently spaced wire turns wound thereon to form the filtering surfaces to keep back the filtering powder along with the dirt trapped therein.

A further object is to provide at least two assemblies, each comprising a plurality of filtering elements, that preferably are halo-like arranged around a supporting spindle, which is operated at time intervals, in order to rotate its assembly of filtering elements, which are thereby passed from a static solvent clarifying condition to a dynamic cleansing condition of the different filtering surfaces. In the latter condition, each assembly operates like a rotor, in order to impart the required turbulent motion to the liquid present within the casing of the assembly, such motion being localized particularly in the zone or zones adjacent to the filtering elements which form part of the different assemblies, whereby to obtain the pumping effect as previously stated, for cleansing the filtering surfaces.

A further object is to provide means whereby the filtering elements of adjacent assemblies are caused to mesh with each other, while being turned, without mutually contacting, in the turbulent flow zones, where the pumping effect occurs, like gears so that the filtering elements that form part of an assembly, get progressively inserted into the intervening spaces left between the corresponding two filtering elements of the other assembly, thereby forming channels, that extend across the whole height of the elements, and through which a forced flow of solvent occurs to obtain a cleansing of the filtering surfaces.

According to another embodiment of the invention, the filtering elements that form part of two adjacent assemblies, do not get in mesh with each other while the assemblies are being turned; the peripheral edges of different elements are instead kept always spaced from one another, whereby a turbulent motion of solvent in the zones adjacent to the filtering elements is likewise obtained; such motion is however less strong than that which is obtained when the elements are brought in mesh with each other.

The solvent filter according to the invention may comprise two or more assemblies that can be turned for the purpose of cleansing the filtering elements, such assemblies preferably having the axes of their supporting spindles lying in the same plane, parallel with each other.

The number of filtering elements in each revolving assembly may range within wide limits, depending on the filter sizes, and on the required filtering thoroughness; thus each filtering assembly may comprise four, eight, sixteen or more filtering elements.

A further object is to provide a construction wherein each filtering element takes the form of a flat, elongated body, having a rhomboidal or a lozenge-shaped cross-section, wherein the side surfaces act as filtering surfaces, formed by a wire winding. The halo-like arrangement of the filtering elements of a single assembly, around the supporting spindle, results in that the elements act as rotor blades while the assembly is being rotated, in order to bring forth the required pumping effect for cleansing the filtering surfaces.

A further object is to make the filter suitable to any requirement, according to different capacities of dry-cleaning plants, by having two or more series of filtering elements, pertaining to the same assembly, placed upon each other, and halo-arranged around the same spindle, to which all elements are secured.

A further object according to the invention comprises a case or housing provided with pipe fittings for the inflow of dirty solvent, the outflow of clear solvent and the discharge of dirt with at least two filtering assemblies, sealed within the same casing consisting each of a central, hollow spindle, to which the halo-arranged filtering elements are rigidly secured, being the ends of wire-winding supporting frames of the elements connected with the related manifolds, by which the inside of each frame is placed in communication with the inside of the hollow supporting spindle, the elongated frames being formed with suitable openings, defining the path of the solvent which, flowing into the filter case, is caused to pass through the filtering surfaces of the different elements, leaving back all dirt in the layer of organic powder, whereafter it flows inside of the frames through the openings, and then to manifolds and inside of the supporting spindles, wherefrom the clarified solvent leaves the filter and is recycled. There is a periodically energized motor means, by which the required rotary motion is imparted to the filtering element assemblies in order to bring forth the solvent pumping action for filter cleansing and means are provided by which the motion of the motor means is transmitted to the spindles of different filtering assemblies.

With the above and other objects in view which will become better understood from the following detailed disclosure of a non-restrictive example and shown in the drawings in which.

Figure 1:
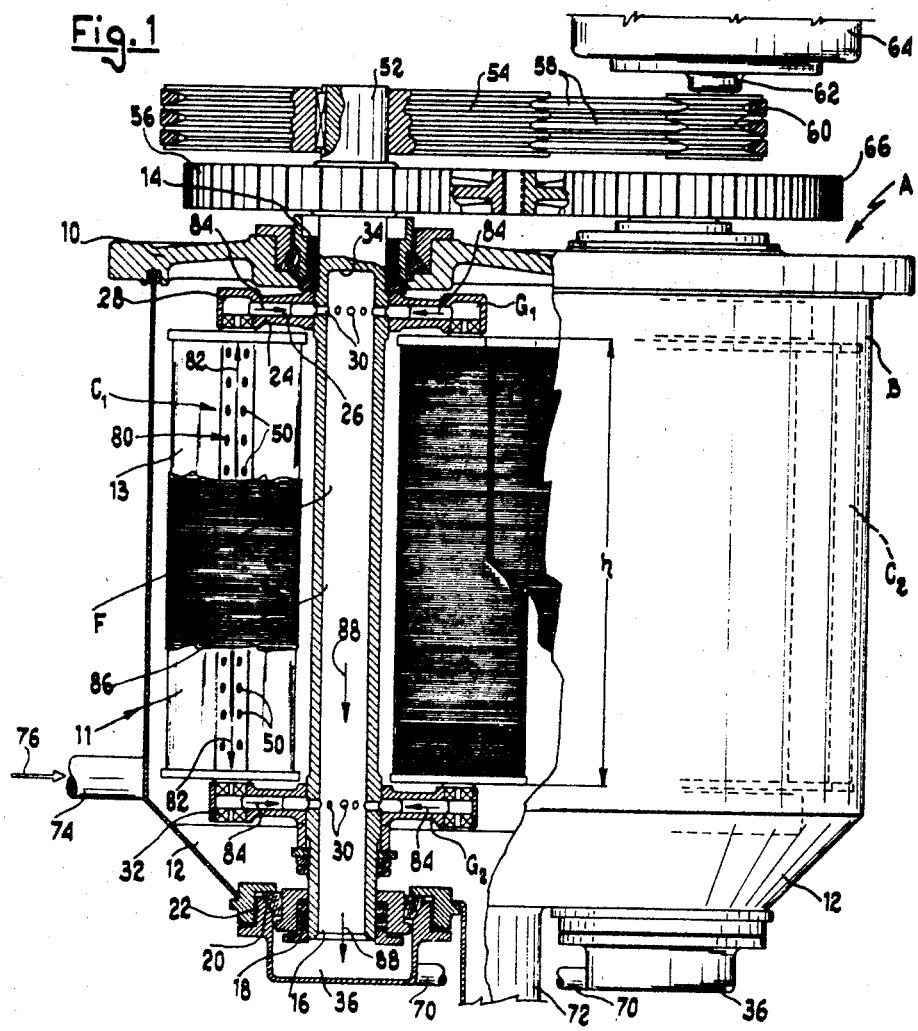
FIGURE 1 is a diagrammatic elevational and partial vertical cross-sectional view of a filter having two rotors with the filtering elements in mesh with each other.

Referring to the drawings, A indicates generally a solvent filter having a housing B, consisting of two hollow cylinders whose spaced side walls are connected along two common generatrices. The top of the housing is tightly closed by a cover 10, while the bottom 12 is cone-shaped. Fitted within the housing are the two assemblies $C_1$ and $C_2$ of the filtering elements $D_1$ and $D_2$ (see FIGURE 2) which consist each of an elongated frame 11, whereon the wire 13 is wound, to form the filtering surfaces.

Each one of the assemblies $C_1$ and $C_2$ consists of an axially bored spindle F rotatingly mounted in a bearing 14 secured to the cover 10. Both shafts F of the two assemblies $C_1$ and $C_2$ are vertical and parallel with each other.

Figure 2:
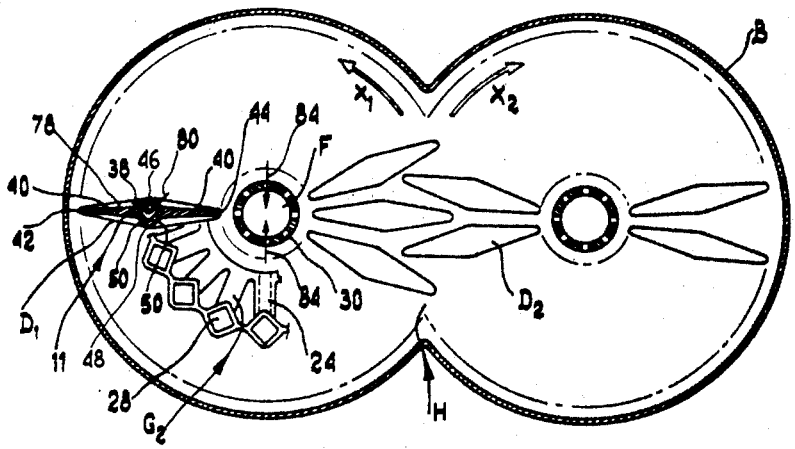
FIGURE 2 is a partial cross-sectional plan view of FIGURE 1.

Keyed on each spindle F are the suitably spaced disks $G_1$ and $G_2$ acting as manifolds as explained in more detail below, with the related plurality of filtering elements $D_1$ and $D_2$ halo-arranged and secured therebetween, as shown in FIGURE 2.

The filtering elements mesh with one another in the zone H, where the turbulent and whirling motion is brought forth, when the assemblies $C_1$ and $C_2$ are rotated, to obtain the pumping effect for the cleansing of the filtering surfaces.

Each hollow spindle F extends out of the casing cover through a seal, while the lower end 16 thereof is laid in a bearing 18, that is retained by a resilient ring 20 in a seat 22 of bottom 12.

Each manifold $G_1$ and $G_2$ keyed to the shaft F, consists of radially extending spokes 24, each having a radial cavity 26, by which the chamber 28 of the manifold is placed in communication with the axial bore of the spindle F, through a related opening 30 in the spindle. Each chamber 28 has a prismatic cross-section, in order that the related prismatic ends 32 of the frame 11 of the filtering element can be disposed into the opposite chambers of two corresponding arms of the manifolds $G_1$ and $G_2$, whereby the filtering element is torsionally fastened to the manifolds and thus also to the spindle F, while at the same time it is kept in communication with the axial bore of the spindle. The upper end of the bore is closed by the partition 34, while its lower end 16 opens into the cup 36.

Each filtering element D, pertaining to the different assemblies $C_1$ and $C_2$, consists of an elongated frame 11, having a central, hollow core 38, that extends the entire height $h$ of the filtering element, as well as a rib 40 whose rounded-off edges 42, 44, along with those 46, 48 of the core form the supporting points for the wire 13 wound on the frame to form the filtering surfaces.

Thus, every filtering element is a flat, elongated body, having a rhomboidal, or lozenge cross-section, which allows arranging radially a plurality of filtering elements fastened to the spindle F to obtain a very large total filtering surface, from the combination of filtering elements of one assembly, thereby giving a very great filtering capacity to the filter.

The walls of the core 38 have a plurality of orifices 50, through which the solvent having percolated through the tiny intervening spaces between the wire turns 13, flows into the core, and then to channels 26 of the manifolds $G_1$ and $G_2$ and into the axial bore of spindle F.

The above holds also for all other elements of the same assembly, as well as for the elements of other assemblies.

Keyed to the upper end 52 of the spindle F is a pulley 54 located above a gear 56, and the pulley is driven by the belts 58, coming from the pulley 60 keyed on the shaft 62 of an electric motor 64. In mesh with the gear 56 is a gear 66, that is keyed on the related end of the spindle F of the other assembly $C_2$. Thus, when the motor 64 is switched on, and its pulley is thereby turned in either direction, the required rotary motion is imparted, through the above described transmission, to gears 56, 66 and to spindles F of the assemblies $C_1$ and $C_2$, that are accordingly rotated.

The lower ends 16 of both parallel, hollow spindles F, lead into the cups 36, which are tightly sealed, in order that the inside of casing B, where the dirty solvent to be filtered is present, be kept apart from the cups 36, where the filtered and clarified solvent, to be recycled, is collected.

Connected with every cup 36 is a pipe 70, leading to a manifold (not shown) by which the cups are placed in communication with the washing chamber, in order to have the clarified solvent recycled therein.

The slush of dirty solvent, that is collected in the cone bottom 12 of casing B, is periodically discharged through the pipe 72, that is connected with the bottom, and conveyed to a distiller for the dry-cleaner.

The performance and operation of the solvent filter is briefly resumed as follows:

While the washing of clothes, underclothes, linen and the like, as placed in the revolving basket, is in progress, the filter A is inserted into the solvent circuit, to exert its filtering action, and to secure that clarified solvent is continuously fed to the basket while the dirt picked-up from the washed clothes is kept back in the filter. The inside of housing B is placed in communication with the basket through the pipe 74 through which the dirty solvent is pumped in the direction of the arrow 76 so that the filter chamber is always filled with the solvent.

In the course of the filtering operation that coincides with the washing operation, the motor 64 is switched off, whereby the assemblies $C_1$ and $C_2$ stand still, and consequently the filtering elements are also inoperative.

The pressured dirty solvent, that is fed through the pipe 74 into the housing B, will flow into the cups 36, and then to pipes 70, to be recycled, after having been clarified, and thus it must pass through the filtering surfaces of elements $D_1$ and $D_2$, in the course of the filtering operation, since the pipe connection 72 is closed.

The solvent is bound to pass through the micrometric interstices as left between the single turns of the wire windings 13, pertaining to the different filtering elements of the two assemblies $C_1$ and $C_2$, thereby leaving, with the aid of the absorbent organic powder, all dirt back on the filtering surfaces, where dirty and even compact cakes are progressively formed.

The solvent, after having passed through the wire winding, and thus now clarified, flows into the inside 78 of each filtering element $D_1$ and $D_2$, and then in the direction of the arrows 80, into the hollow core 38 of each frame of the single elements, whereafter it reaches, flowing in the direction of arrows 82, the manifolds $G_1$ and $G_2$, which radial ducts are centripetally traversed by the solvent in the direction of the arrows 84, to flow finally into the bores 86 of the spindles F, through the orifices 30 thereof.

From the bores 86 of spindles F, the clarified solvent flows in the direction of arrows 88 into the cups 36 and then it is collected, through the pipe connections 70, in a related manifold, by which it is brought back into the washing basket.

After the end of the washing operation, and thus also of the filtering steps, all the filtering surfaces of filter A are automatically cleansed.

To such a purpose, the duct 74, through which the solvent flows to filter, and the duct 70, through which it flows therefrom, are plugged, and also the pipe connection 72 is kept closed.

The motor 64 is switched on, thereby driving the gear 56, and consequently also the gear 66, along with the related spindles F.

Assumed that the sense of rotation of spindle F, in respect of assembly $C_1$, be that indicated by the arrow $X_1$ in FIG. 2, the sense of rotation of assembly $C_2$ will be that indicated by the arrow $X_2$.

From this time onward, and for the whole cleansing step time, each one of the assemblies $C_1$ and $C_2$ acts as a rotor, i.e. it operates as a bladed drum stirrer (being the blades represented by the different elements $D_1$ and $D_2$ of the same assemblies), in order to impart the required motion to the liquid that is present in the filter.

In fact, a violent rotary motion is imparted to the liquid, i.e. to solvent by which the filter chamber is filled, by the rotary motions directed in opposite directions of the two rotors; in particular, the amount of solvent that is adjacent to assembly $C_1$, is caused to rotate in the direction of arrow $X_1$, while the solvent adjacent to assembly $C_2$ is caused to rotate in opposite direction.

Both liquid flows collided with each other in the zone H, adjacent to filtering elements $D_1$ and $D_2$, where in the considered case the filtering elements get mutually in mesh, without however coming into contact, thereby bringing forth a strong turbulence of liquid in the same zone.

As shown in FIGURE 2, the getting in mesh of filtering elements is such as to cause the formation of channels M, which obviously extend along the whole height $h$ of the elements, now acting as blades, and through which the solvent is compelled to pass, since it is subjected to a pumping effect in said zone, due to the fact that the mutual engagement of revolving blades may be compared to the getting in mesh of the teeth of a gear pump.

The above stated pumping effect results in the filtering surfaces of the different elements $D_1$ and $D_2$ of both rotors, which are sequentially brought into the turbulence zone H, being flooded by a liquid having a high momentum, whereby the crusts and deposits of dirt and organic powder, as formed on the filtering surfaces which consist of wire windings 13 are forcibly and wholly carried away, thus leaving such surfaces thoroughly cleansed and ready for the next filtering operation.

The automatic cleansing step lasts a short time only, and is discontinued as soon as the motor 64 is switched off, thereby stopping the rotors $C_1$ and $C_2$, which resume their standstill position, that is maintained through the whole filtering time.

After the end of the automatic cleansing step, as caused by the rotary motion of assemblies $C_1$ and $C_2$, the filter can be submitted to a countercurrent washing, by causing the solvent to flow, rather than from the pipe connection 74 to pipe connections 70, in the opposite direction, i.e. from the pipe connections 70 to the pipe connection 74, whereby the liquid is discharged from the outside of filtering elements $D_1$ and $D_2$, thus removing the last dirt particles possibly yet present on the wire.

After a given number of filtering and automatic cleansing steps, the duct 72 is opened, in order to discharge the organic powder and dirt mud into the distiller, where said powder is recovered.

Figure 3:
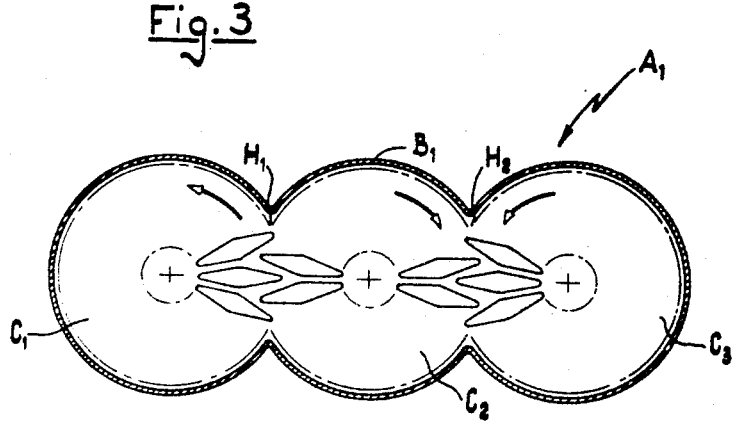
FIGURE 3 is a view similar to that of FIGURE 2 showing a filter comprising three filtering assemblies in mesh with each other.

Referring now to FIGURE 3, this shows the cross-sectional view of a filter $A_1$ wherein the casing $B_1$ consists of three cylinders, merging with one another, and wherein the assemblies $C_1$, $C_2$ and $C_3$ are fitted. The filtering elements thereof are again in mesh, in order to cause the turbulent motion in the zones $H_1$ and $H_2$, for the cleansing of filtering surfaces.

Figure 4:
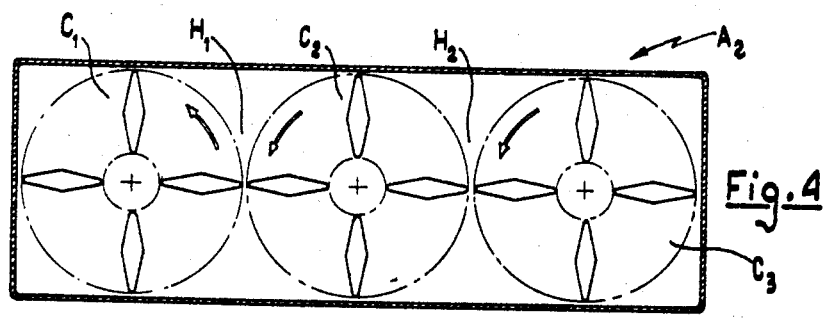
FIGURE 4 is a view similar to that of FIGURE 3 of a modification in which the filtering elements are not in mesh with each other.

FIGURE 4 shows a cross-sectional view of another embodiment form of a filter $A_2$, that again comprises three assemblies $C_1$, $C_2$ and $C_3$, which filtering elements, however, come not in mesh with each other while being rotated, i.e. while acting as rotors. The senses of rotation of each rotor are those indicated in FIGURE 4, since they have been considered as the most suitable for bringing forth the turbulent motion in the zones $H_1$ and $H_2$.

Figure 5:
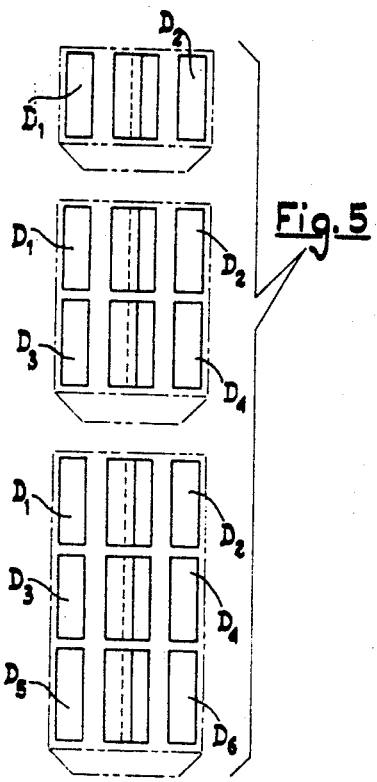
FIGURE 5 is a diagrammatic side view, showing an arrangement of filtering elements in a filter having two rotors that comprise respectively one, two and three series of superposed, meshing elements.

FIGURE 5 shows, from top to bottom sections thereof, respectively the arrangement of one row only of filtering elements $D_1$, $D_2$, in mesh with each other, and pertaining to two rotors, as shown in FIGURE 1; of two superposed series of filtering elements $D_1$, $D_2$, $D_3$ and $D_4$, again pertaining to two rotors and finally of three superposed series of filtering elements $D_1$, $D_2$, $D_3$, $D_4$, $D_5$ and $D_6$, again pertaining to two rotors, and in mesh with each other.

Figure 6:
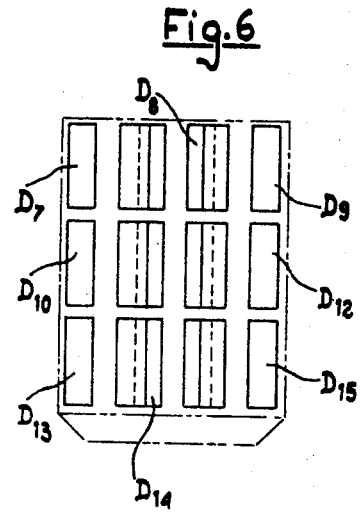
FIGURE 6 is a side view similar to that of FIGURE 5, showing the filter of FIGURE 3, comprising three rotors with three series of superposed filtering elements, in mesh with each other.

FIGURE 6 shows three superposed series of filtering elements $D_7$–$D_{15}$, pertaining to three parallely fitted rotors, like those shown in FIGURE 3, and in mesh with one another.

Starting then from one row only of filtering elements, and coming up to two, three or more superposed series, the filtering surface of one filter can be conveniently increased, since it is sufficient to add the required series on the same spindles, without the necessity to have a larger filter substituted for the preceding one.

It is therefore possible to adapt the same filter to different capacities of single dry-cleaning plants.

Moreover, the sizes of the filtering elements as shown, can be standardized, i.e. the same elements can be made always with the same sizes, while their number will vary, each time, depending upon the sizes of the revolving assemblies and of the number of rows of filtering elements that are fitted on the different spindles.

Thus, the assembling of different filtering elements and the replacement thereof, are made much more easy, while the stock to be kept in store in standarized, with all the related advantages of less space requirements and the like.

Both the frames of the filtering elements, as well as the plates by which the manifolds are made, can advantageously be of molded plastics.

While certain, specific forms of the invention have been herein shown and described, various changes may be made therein, without departing from the scope of the invention, as defined in the appended claims.

What I claim is:
1. A solvent filter and filter cleansing unit comprising in combination:
   (a) a casing;
   (b) a plurality of filter assemblies mounted for rotation in said casing on spaced parallel hollow shafts;
   (c) means including gear means operatively connected to and for rotating said assemblies;
   (d) each filter assembly comprising
      (1) a plurality of elongated vane-like hollow filter elements having filtering surfaces; and
      (2) means for uniformly spacing the elements from each other and from said shafts, with the longitudinal plane of each filter element disposed in a radial converging intersecting manner relative to the axis of the associated shaft;
   (e) means for communicating the filter elements with the hollow shafts;
   (f) means for circulating the cleansing solvent into the casing and out of the casing via the hollow shafts; and
   (g) means juxtaposing said assemblies in said casing and for selectively imparting relative rotation to the respective assemblies such that the elements rotate in close non-touching proximity at a sufficient rate to generate turbulent flow of the filter solvent in the path of the elements to cleanse the filtering surfaces thereof.

2. A filter unit as defined in claim 1 wherein the means of paragraph (e) include manifold means for interconnecting said hollow shafts and said filter elements, said manifold means located at the top and bottom of said elements, and said shafts having openings communicating with said manifolds.

3. A filter unit as defined in claim 1 wherein each filtering element has filtering surfaces and includes:
   (a) an elongated central hollow apertured core;
   (b) flattened elongated rib members coextensive with and of substantially less thickness than said core projecting from diametrically opposite sides of said core and terminating in rounded edges;
   (c) said rounded edges of said ribs and side portions of said core providing a supporting surface of generally rhomboidal cross section for the filtering surface disposed thereon; and
   (d) small diameter wire wound in closely consecutive convolutions about said ribs and core portion to form the filtering surface having micrometric filtering interstices between the wire convolutions.

4. A filter as set forth in claim 1 wherein a plurality of series of superposed filtering elements are provided upon each shaft.

5. A filter unit as set forth in claim 1 wherein said filter elements comprise a ribbed frame and said frame is made of molded plastic.

6. A filter unit as defined in claim 1 including a cover for said casing, seal means in conjunction with shaft apertures in said cover, and said shafts sealingly extend through said cover.

7. A filter as set forth in claim 1 wherein said hollow shafts are apertured, and including cups disposed adjacent the lower end of said shafts for receiving the cleansed solvent.

8. A solvent filter and filter cleansing unit comprising in combination:
   (a) a casing;
   (b) a plurality of filter assemblies mounted for rotation in said casing on spaced parallel hollow shafts;
   (c) means including gear means operatively connected to and for rotating said assemblies;
   (d) each filter assembly comprising
      (1) a plurality of elongated vane-like hollow filter elements having filtering surfaces; and
      (2) means for uniformly spacing the elements from each other and from said shafts, with the longitudinal plane of each filter element disposed in a radial converging intersecting manner relative to the axis of the associated shaft;
   (e) means for communicating the filter elements with the hollow shafts;
   (f) means for circulating the cleansing solvent into the casing and out of the casing via the hollow shafts;
   (g) said filter elements being cross-sectionally shaped and dimensioned so that those on adjacent assemblies will intermesh without contact of said elements or shafts upon rotation of said assemblies; and
   (h) means juxtaposing said assemblies in said casing and for selectively imparting relative rotation to the respective assemblies to effect intermeshing non-touching rotation at a speed sufficient to generate turbulent pumping action of the solvent in the path of the rotating elements to cleanse the filter element surfaces.

9. A filter unit as defined in claim 8 wherein the means for rotating the assemblies include means for imparting contra-rotation to adjacently disposed filter assemblies.

10. A method for automatically cleansing solvent filters as used in dry cleaning filter units having at least two pluralities of cross-sectionally elongated filter elements relatively mounted on adjacent parallel spaced shafts, comprising the steps of:
   (1) Arranging said pluralities of filter elements in uniformly spaced relation apart from said shafts with the longitudinal plane of each filter element being in a radial fan-like manner coexistensive with the axis of the shafts and for rotation with said shafts, within a filter unit casing having cleaning solvent fluid circulating therethrough;
   (2) rotating said filter elements in a manner whereby the projected longitudinal planes of said elements of one assembly continually intersect with those of the adjacent assembly; and
   (3) imparting relative rotation by positive mechanical drive means to said assemblies to briskly rotate said filter elements in close but non-touching relation to generate turbulent flow of the solvent fluid thereabout, said turbulent motion of the solvent acting on and cleaning the surfaces of said filtering elements.

11. The method as defined in claim 10 including the step of selectively counter-rotating said shafts in a manner to interleave filter elements of adjacent assemblies.

References Cited
UNITED STATES PATENTS

| | | | |
|---|---|---|---|
| 1,264,635 | 4/1918 | Graham | 210—331 |
| 2,081,198 | 5/1937 | Hahn | 210—497.1 |
| 2,940,596 | 6/1960 | Collins | 210—347 |
| 3,019,903 | 2/1962 | Daane | 210—329 X |
| 3,202,284 | 8/1965 | Wade | 210—346 X |
| 3,326,383 | 6/1967 | Pranovi | 210—167 X |

REUBEN FRIEDMAN, *Primary Examiner.*

J. L. DECESARE, *Assistant Examiner.*

U.S. Cl. X.R.

210—331, 347, 497.1